3,442,845
HOT AND COLD WATER REDISPERSIBLE POLYVINYL ACETATE ADHESIVES
Peter Spiros Columbus, Whitestone, N.Y., and Carl Reinhold Erikson, Maywood, N.J., assignors to The Borden Company, New York, N.Y., a corporation of New Jersey
No Drawing. Filed Nov. 4, 1966, Ser. No. 591,951
Int. Cl. C09 3/14, 29/30
U.S. Cl. 260—29.6
7 Claims

ABSTRACT OF THE DISCLOSURE

This invention relates to polyvinyl acetate adhesives redispersible in hot and cold water with any dried film comprising an emulsion of a polyvinyl acetate, a non-thermoplastic water-soluble anti-coalescing agent of the type hereindescribed and a non-volatile, water-soluble plasticizer for said anti-coalescing agent that is immiscible with the polyvinyl acetate resin, said plasticizer being present in amount to impart flexibility to the dried adhesive film and the ratio of polyvinyl acetate to anti-coalescing agent not exceeding from about 7 parts by weight of acetate for each part by weight of agent.

---

Polyvinyl acetate emulsions are commonly used in making multi-purpose adhesives; that is, adhesives which can be used to adhere such substrates as wood, paper, cloth, plastic and the like. Because such polyvinyl acetate has a glass transition temperature (Tg) at about room temperature the acetate particles will coalesce to form a water resistant dry film at ambient temperature. This coalescence is made more extensive by the water-immiscible plasticizers for the acetate that are used in order to impart flexibility to the dry film. When such adhesive dries on a surface from which it is desired to remove it, it cannot be readily washed off with water or with water and soap solutions. In fact if hot water is used the polyvinyl acetate coalesces irreversibly to form an even more water-resistant film. Consequently, solvents for polyvinyl acetate are employed for the purpose of removal of the film.

For many uses, washability of such polyvinyl acetate adhesives in water is desired, particularly because of the fact that in their use, as by young children, the adhesives are often inadvertently deposited on clothing, tablecloths, carpets and other surfaces. Since solvents must be used the surface from which the film is to be removed is often damaged or discolored by the solvent. Furthermore, the use of a solvent brings with it the hazards of fire and toxicity. It has long been desired to retain the excellent all-purpose adhesive properties of polyvinyl acetate adhesives, while at the same time eliminating the need for solvent to remove the film from surfaces onto which the film is deposited.

It has now been found possible to impart the needed redispersibility to the dried adhesive film in cold or hot water without affecting the general purpose adhesive properties of the polyvinyl acetate adhesive.

Briefly stated, the present invention comprises an aqueous emulsion of a polyvinyl acetate, a non-thermoplastic water soluble anti-coalescing agent in an amount sufficient to prevent irreversible coalescence of the polyvinyl acetate, and a non-volatile, water-soluble plasticizer for the anti-coalescing agent that is immiscible with the polyvinyl acetate.

The polyvinyl acetate used is preferably one having a molecular weight ranging from about 30,000 to 60,000, although higher and lower molecular weight resins can be used. In commercial practice it is preferred to use polyvinyl acetate emulsions that are homopolymer dispersions of a total solids content of 55%. The particle size of the dispersed acetate particles is important in that the larger the particle, the less tendency to coalesce. It is preferred, therefore, to have the majority of the particles ranging from about 1 to about 3 microns in diameter, and the remainder at least as large.

The anti-coalescing agent used is any non-thermoplastic water-soluble material compatible with polyvinyl acetate in aqueous dispersions. Polyvinyl alcohol is the preferred agent and suitably one having a medium Brookfield viscosity of 19 to 25 cps. (4% aqueous solution, 20° C.) and hydrolyzed to the extent of 87–89%, although the other viscosity and hydrolyzed grades of polyvinyl alcohol can be used. Also suitable are the water soluble cellulose ethers, gums, gelatinized starches, water soluble grades of gelatin, and mixtures thereof. Specific examples are carboxymethylcellulose, carboxyethylcellulose, hydroxyethylcellulose, and sodium alginate.

As to the plasticizer, it is necessary that it be non-volatile, water soluble and immiscible with the polyvinyl acetate, while at the same time plasticizing the anti-coalescing agent. Thus the particular plasticizer used will depend upon the anti-coalescing agent employed. For example, with polyvinyl alcohol it is preferred to use glycerol, although other plasticizers such as sorbitol, propylene glycol, diethylene glycol, and water-soluble polyethylene glycol can also be used. These plasticizers can also be utilized with the other anti-coalescing agents noted above.

The proportion of acetate to anti-coalescing agent is critical in that there must be at least an amount of agent present to prevent irreversible coalescence of the polyvinyl acetate under hot and cold water washing. It has also been found that the amount is not to be more than about 7 parts by weight of the acetate for each part by weight of the anti-coalescing agent. It is preferred to use about 4.5 parts of acetate for each part of the anti-coalescing agent with a ratio of about 2 to 1 as a commercial minimum for suitable washability and adhesive properties. While lower ratios of acetate to agent and even a preponderance of agent can be used the multi-purpose adhesive properties are adversely affected.

As a rule, the softening point for the polyvinyl acetate resin varies directly with the molecular weight of the resin dispersed in water. Thus, for optimum results the ratio of acetate to agent is varied within the limits set forth above dependent upon the molecular weight of the polyvinyl acetate and the water resistance of the dry film. Also, polyvinyl acetate resins differ in their degree of cross-linking with increased cross-linking having a comparable effect on softening point as does increased molecular weight. Again, therefore, for optimum results the amount of anti-coalescing agent used is varied within the ratios established, taking cross-linking into account.

To impart the required flexibility to the film for optimum use of the adhesive it is preferred to use at least about 35% by weight of plasticizer, based on the weight of anti-coalescing agent, although the proportions of plasticizer used can range up to 100% by weight of anti-coalescing agent used.

In preparing such adhesives, it is preferred to first admix the plasticizer with the anti-coalescing agent and then to add to this solution the dispersion of polyvinyl acetate in water.

In addition to the components noted above, other constituents, such as preservatives, anti-foaming agents, buffers, and pigments, can be added to the emulsion in the usual proportions for their usual effect.

The table set forth below shows the illustrative and preferred proportions of the components of the adhesive as applied for each 100 parts by weight of polyvinyl acetate.

| | Parts by weight for 100 parts acetate | |
|---|---|---|
| | Illustrative | Preferred |
| Polyvinyl acetate | 100 | 100 |
| Anti-coalescing agent | 14–50 | 18–25 |
| Plasticizer | 2–30 | 9–18 |

The invention will be further described in connection with the following examples which are set forth for purposes of illustration.

EXAMPLE 1

A polyvinyl acetate adhesive was prepared from the following formulation:

| | Parts by weight |
|---|---|
| Polyvinyl acetate | 31.43 |
| Polyvinyl alcohol (88% hydrolyzed) | 7.03 |
| Glycerol | 2.44 |
| Sodium bicarbonate | .1 |
| Preservative (o-phenylphenol) | .06 |
| Defoamer (colloid No. 581) | .33 |
| Water | 58.61 |
| | 100.00 |

The adhesive was prepared by admixing 31.24 parts of the water with the polyvinyl alcohol and defoamer in a jacketed tank equipped with agitators. The mixture was allowed to soak for one-half hour and was then heated to about 85° C. and held at that temperature for 20 minutes at the end of which time the alcohol was in solution. The solution was then cooled to 65° C., the preservative added, and then further cooled to 55° C. and the polyvinyl acetate, sodium bicarbonate and remaining water added. The preservative and polyvinyl acetate were added with agitation. While continuing the agitation the emulsion was cooled to 40° C. and the glycerol added. The emulsion was then filtered and packaged in drums.

The product had a viscosity of about 3,300 cps.; the viscosity being measured with an LVF Brookfield using a number 4 spindle, 60 r.p.m., 25° C. When applied to a substrate and allowed to dry the film formed was readily redispersible with both cold and hot water.

EXAMPLE 2

An adhesive was prepared as set forth in Example 1, except that the parts by weight of the various components were as follows:

| | Parts by weight |
|---|---|
| Polyvinyl acetate | 37.98 |
| Polyvinyl alcohol | 8.5 |
| Glycerol | 2.95 |
| Sodium bicarbonate | .12 |
| Preservative (o-phenylphenol) | .1 |
| Defoamer (colloid No. 581) | .1 |
| Water | 50.15 |
| | 100.00 |

The final product had a Brookfield viscosity (measured as in Example 1) of about 2,600 cps. and a dried film thereof was redispersible in both hot and cold water.

EXAMPLE 3

An adhesive was prepared from the same formulation as employed in Example 1 except that the polyvinyl acetate, sodium bicarbonate, and 31.24 parts of water were admixed to form an emulsion which was then added to the solution when it had cooled to 55° C. The resultant product also had a Brookfield viscosity of about 3,300 cps. and the dried film thereof was redispersible in hot and cold water.

EXAMPLE 4

An adhesive was prepared as set forth in Example 3, except that the formulation was as follows:

| | Parts by weight |
|---|---|
| Polyvinyl acetate | 31.43 |
| Hydroxyethyl cellulose | 7.03 |
| Glycerol | 2.44 |
| Sodium bicarbonate | .1 |
| Preservative (o-phenylphenol) | .06 |
| Defoamer | .33 |
| Water | 58.61 |
| | 100.00 |

The resultant product when in dried film form was redispersible in cold and hot water.

EXAMPLE 5

A series of adhesives is made using the procedure and formulation employed in making the adhesive of Example 4 except that carboxymethylcellulose, carboxyethylcellulose, and sodium alginate are each separately and in turn substituted in equal amounts for the hydroxyethylcellulose. In each instance a product is obtained which is redispersible in hot and cold water when in dried film form.

EXAMPLE 6

Two different washing tests were made on swatches of cloth made of acetate, corduroy, cotton, dacron, 65% Dacron–35% cotton, silk, wool, and a mixture of wool and acetate which had been saturated with the adhesive of Example 3 (adhesive A) and a commercial polyvinyl acetate adhesive (adhesive B) having an acetate to polyvinyl alcohol of 10:1.

(a) The first test consisted of dipping a swatch of each of the different cloths with adhesive A and a heparate swatch of each of the different cloths with adhesive B, pressing the swatches to remove the excess adhesive, and hanging the swatch to dry. After drying for 24 hours the swatches were stiff and were washed in cold and hot water under laboratory conditions simulating a typical washing machine cycle. The cold water wash was accomplished by using Cold Power and the hot water with Ivory Soap. Except for water temperature the washing procedures were identical. One gram of the detergent or soap was placed into a quart jar with the swatch and the jar filled ¾ full with water; water from the cold water faucet (about 70° F.) for the cold water wash and water at 160°–170° F. for the hot water wash. In addition to the samples washed with detergent or soap, samples were also washed with plain hot tap water at 160°–170° F. as well as "cold" water at 70° F. The quart jars were agitated in a laboratory shaker for one-half hour (180 shakes per minute; each shake representing a forward and backward motion). The fabrics were then rinsed with hot or cold water depending on the washing procedure used and after being wrung, they were hung to dry. Each dry fabric was then examined for cleanliness and stiffness and compared with its original unsoiled counterpart. The fabrics soiled with adhesive B were still stiff and saturated with dried adhesive while those soiled with adhesive A were soft and clean.

(b) The second test was a spot soiling test. The fabrics were soiled with circular spots of adhesives A and B approximately 3 inches in diameter and the adhesive was allowed to dry overnight. A line was made with a red pencil dividing each circle in half. The soiled fabric was then placed on a clean towel and the lower semi-circle was given 25 strokes with a towel dipped in hot water (160° F.). The upper semi-circle was given 25 strokes with a towel dipped in water at room temperature (approximately 75°). Adhesive A washed off readily with both hot and cold water whereas adhesive B could not be removed.

In all of the washing tests above, it was found that adhesive A was cleaned from soiled fabrics just as readily with cold water as with hot water. Also the use of soap or detergent did not make a marked difference in respect to the degree of cleaning obtained.

It will be understood that it is intended to cover all changes and modifications of the examples of the invention herein chosen for the purpose of illustration which do not constitute departures from the spirit and scope of the invention.

What is claimed is:

1. A polyvinyl acetate adhesive redispersible in hot and cold water when in dried film form, consisting essentially of an emulsion of a polyvinyl acetate; a non-thermoplastic, water-soluble anti-coalescing agent selected from the group consisting of polyvinyl alcohols, water-soluble cellulose ethers, gums, gelatinized starches, water-soluble grades of gelatin, and mixtures thereof; and a non-volatile, water-soluble plasticizer for said anti-coalescing agent that is immiscible with the polyvinyl acetate resin, said plasticizer being present in amount to impart flexibility to the dried adhesive film and the ratio of polyvinyl acetate to anti-coalescing agent not exceeding from about 7 parts by weight of acetate for each part by weight of agent.

2. The adhesive of claim 1, in which the plasticizer is present in an amount at least about 35% by weight of anti-coalescing agent present.

3. The adhesive of claim 2, in which the plasticizer is selected from the group consisting of glycerol, sorbitol, propylene glycol, diethylene glycol, and water soluble polyethylene glycol.

4. The adhesive of claim 3, in which the anti-coalescing agent is polyvinyl alcohol and the plasticizer is glycerol.

5. The adhesive of claim 4, in which the polyvinyl acetate has a molecular weight of about 30,000 to about 60,000 and the size of the acetate particles is larger than 1 micron, and the polyvinyl alcohol has a viscosity of from 19 to about 25 cps. and is hydrolyzed to the extent of from about 87 to about 89%.

6. The adhesive of claim 5, in which the ratio by weight of acetate to alcohol varies from about 7:1 to about 2:1.

7. The adhesive of claim 1 in which there is, for each 100 parts by weight polyvinyl acetate, from about 14–50 parts anti-coalescing agent and 2–30 parts by weight plasticizer.

References Cited

UNITED STATES PATENTS 2,850,468 9/1958 Giggey.
3,094,500 6/1963 Herman.
3,197,429 7/1965 Baatz.

FOREIGN PATENTS 623,053 7/1961 Canada.

WILLIAM H. SHORT, *Primary Examiner.*

E. M. WOODBERRY, *Assistant Examiner.*

U.S. Cl. X.R.

117—6; 260—8, 9, 17

UNITED STATES PATENT OFFICE
CERTIFICATE OF CORRECTION

Patent No. 3,442,845                              May 6, 1969

Peter Spiros Columbus et al.

It is certified that error appears in the above identified patent and that said Letters Patent are hereby corrected as shown below:

Column 3, line 59, ".1" should read -- .2 --. Column 4, line 37, "heparate" should read -- separate --; line 73, "75°" should read -- 75° F. --; line 73, before "washed" insert -- was --.

Signed and sealed this 14th day of April 1970.

(SEAL)
Attest:

Edward M. Fletcher, Jr.                    WILLIAM E. SCHUYLER, JR.
Attesting Officer                            Commissioner of Patents